R. W. McCLELLAND.
Running-Gears for Vehicles.

No. 154,065.  Patented Aug. 11, 1874.

Witnesses.

Inventor
R. W. McClelland.
by his Attys.
Hill & Ellsworth

UNITED STATES PATENT OFFICE.

ROBERT W. McCLELLAND, OF CERRO GORDO, ILLINOIS.

IMPROVEMENT IN RUNNING-GEARS FOR VEHICLES.

Specification forming part of Letters Patent No. 154,065, dated August 11, 1874; application filed May 29, 1874.

CASE D.

*To all whom it may concern:*

Be it known that I, ROBERT W. McCLELLAND, of Cerro Gordo, in the county of Piatt and State of Illinois, have invented a new and Improved Skeleton Wagon; and I do hereby declare the following to be a full and exact description of the same, reference being had to the accompanying drawings forming part of this specification, in which—

Figure 1:
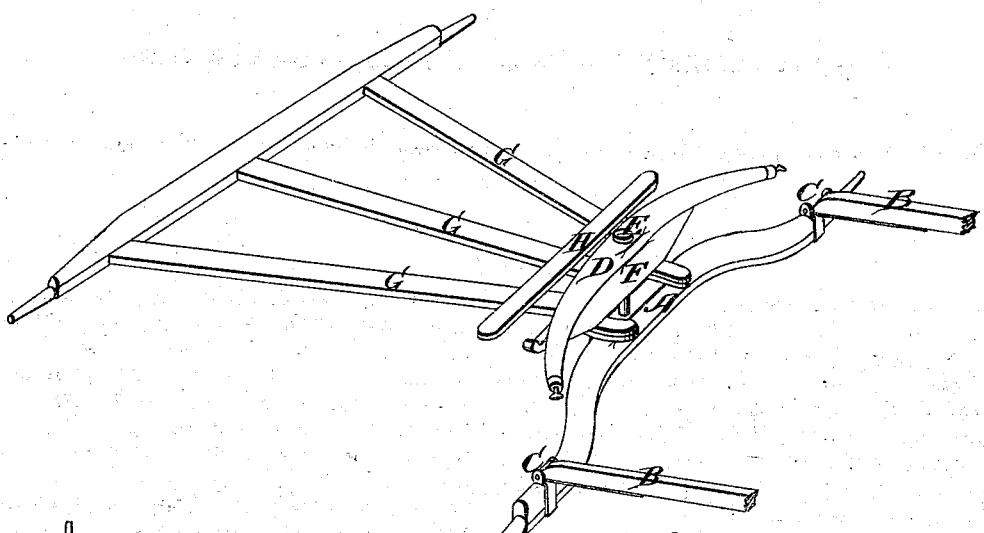
Figure 2:
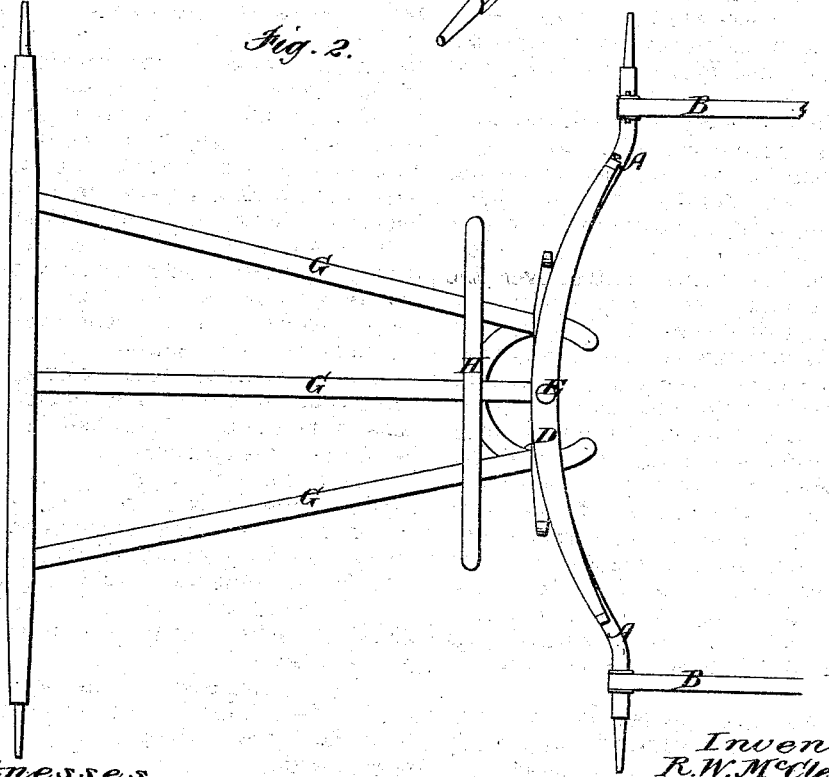

Figure 1 is a perspective view of the frame of my improved skeleton wagon without the wheels and seat; and Fig. 2, a top plan view of the same.

Similar letters of reference in the accompanying drawings denote the same parts.

This invention has for its object to provide a strong, light, and durable skeleton wagon or sulky for fast driving, in which the driver shall be enabled to sit close to the horse, thereby giving him better control over the animal, and making the draft lighter. To this end the invention consists, first, in curving the front axle backward horizontally from the end to the center; secondly, in attaching the thills directly to the axle, each independently of the other, without the usual cross-bar; and, thirdly, in pivoting the whiffletree to the king-bolt above the bolster, the whiffletree having the same degree of curvature as the axle. By means of this construction the horse is attached to the wagon much nearer the driver than heretofore, the backward curve of the axle and whiffletree forming a recess which prevents the animal's legs from striking, all of which I will now proceed to describe.

In the drawings, A represents the front axle, which is curved backward horizontally from the ends to the center, any suitable degree of curvature being employed. B B are the thills, each being independent of the other, and attached to the axle A by a suitable clip, C, the usual cross-bar connecting the thills being omitted. D is the whiffletree, which is curved to correspond with the axle A, and is pivoted by the king-bolt E, preferably to the upper side of bolster F, as shown, although it may be located below, if desired. G G are the reaches provided with a cross-bar, H, the latter constituting a rest for the feet of the driver. By attaching the thills directly to the axle and pivoting the whiffletree on the king-bolt, I dispense with the cross-bar, to which the whiffletree is usually pivoted, give the draft an upward tendency, thereby in a measure counteracting the weight of the driver, and attach the horse to the skeleton or sulky much closer to the driver than heretofore—say from two to three feet, according to the curvature of the axle, the latter constituting a recess, in which the hind legs of the horse may work without striking.

In consequence of this close proximity the driver is enabled to exercise more perfect control over his horse. The seat is attached to the wagon-frame in the usual manner.

I claim as my invention—

1. In a skeleton wagon or sulky, the front axle A, curved backward horizontally from the ends to the center, substantially as described, for the purpose specified.

2. In a skeleton wagon or sulky, the independent thills B, combined with and attached directly to the axle, substantially as described, for the purpose specified.

3. In a skeleton wagon or sulky, the whiffletree D, combined with and pivoted by the king-bolt, substantially as and for the purpose set forth.

4. The combination of the curved axle A, independent thills B, and whiffletree D, all to operate substantially as and for the purpose specified.

ROBT. W. McCLELLAND.

Witnesses:
J. B. RUSSELL,
W. A. McCLINTOCK.